2,872,335

METHOD OF MANUFACTURING EXTENDED PIGMENTS

James D. Bronson, Jr., San Francisco, Calif., assignor to Thomsen Research Co., Inc.

No Drawing. Application April 3, 1956
Serial No. 575,700

3 Claims. (Cl. 106—292)

The aim and object of my process is to produce a superior type of material especially suited for incorporation into the web of fiber formed upon a paper machine and equally suited as an ingredient of the coating subsequently applied in the manufacture of coated papers. Such material is conventionally referred to as "fillers," "loading materials" and "coating pigments." Examples are, of course, clay, calcium carbonate and silicate, talc, "satin white," gypsum, titanium dioxide, etc. However, as such pigments have a far wider field than paper making I do not confine myself to this application alone, but claim the use of my process for the manufacture of extended pigments in the manner to be described irrespective of the use to which said pigments may ultimately be applied.

My process depends upon the fact that if a carbonate of a metal selected from the group consisting of calcium, magnesium, barium, and zinc, all such carbonates being white in color, be suspended in a solution of titanium fluoride, then a basic insoluble titanium compound commingled with the fluoride of the base selected will be formed with liberation of carbon dioxide. The individual particle of carbonate will, therefore, increase in mass while retaining a nucleus of unreacted carbonate.

Contrariwise, the titanium solution will steadily lose in strength and at completion of the reaction not even a trace of water-soluble titanium can be found. The phenomenon described is thus seen to be truly one of extending the surface coverage of the titanium pigment precipitated upon the carbonate. I am aware that such "extension" of titanium upon barium sulphate and calcium sulphate is old in the industry but actually the expression is a misnomer. As of today the barium combination has passed into limbo, and while the calcium sulphate-titanium pigment is widely used the function served by the calcium sulphate ingredient is only one of "bulking" in the finished pigment. Often the final product is merely called a mixture. In my case, however, it will be evident that the residual nucleus is actually coated with the precipitated material and hence the name "extended" is properly used.

As a preferred version I will give the interaction between calcium carbonate and titanium fluoride. To 1000 l. of water I add 100 pounds of precipitated chalk and maintain the mixture in a state of agitation. I then add a solution of titanium fluoride, previously purified if needed, in the form of a solution containing approximately 50 grams of titanium per liter. The mixture is best made at room temperature. Heat is then applied until approximately 100° C. is reached and in less than 30 minutes a test of a filtrate sample will show no sign of soluble titanium remaining. For practical purposes the water in which the pigment is suspended is just pure water, hence the snow white mixture is ready to add forthwith in any amount desired to the furnish for the paper machine. Conversely, of course, it may be formed into a solid cake upon a filter and finally dried for use in other ways.

Obviously, the actual percentage of titanium in the finished pigment depends upon the amount of titanium fluoride added, and this item is entirely under the control of the operator. In general, if the mixture is to be used directly as a part of the furnish to the paper machine then I elect to add such an amount that the titanium ingredient of the finished pigment shall be between 20% and 50%, stated as titanium dioxide. For coating purposes a denser product may well be preferred. As stated, this is optional.

If the pigment is to be used ultimately in a dry state then a small gain in opacity may be obtained by a gentle calcination. This is entirely different from the severe treatment to which all titanium pigments are customarily subjected. I find a temperature of 600° C. all that is needed and as little as 400° C. will generally produce optimum results. The reason is, of course, that the initial crystallization of the titanium is already in the form of rutile and mere dehydration is all that is achieved in the calcination.

In any case the structure of the finished pigment is diverse from that obtained in the conventional practice of manufacturing titanium dioxide. In effect, what is obtained by my process is that the mixture of calcium fluoride and titanium which coats the nucleus is in the nature of a pseudomorph after the crystal form which it replaces, being thus either in the mold of calcite or aragonite depending upon the crystal form of the precipitated chalk selected. Many of the difficulties encountered in the use of titanium in paper work are thus eliminated or at least minimized. Of great importance is the enhanced retention of the pigment, due undoubtedly to this very matter of improved particle shape. Unlike most pigments the retention, percentage-wise, is little affected by the amount added being in direct ratio to the amount furnished.

Having thus fully described the reaction between calcium carbonate and titanium fluoride I will next consider modifications of the concept by the substitution of other carbonates. Inasmuch as magnesium fluoride is almost as insoluble as calcium fluoride, practically considered, it follows that magnesium carbonate may be substituted for calcium carbonate in any proportion deemed desirable or found advantageous for technical or economic reasons. Similarly, by performing the precipitation in a solution saturated with the corresponding fluoride even zinc or barium carbonate can be substituted for the almost insoluble products obtained when calcium or magnesium are the selected bases employed.

While titanium fluoride in water solution is a relatively stable form of titanium, hence permitting thorough purification from objectionable impurities, the uses of the chloride and/or sulphate is not excluded, though for all practical purposes the fluoride will generally be preferred. Similarly, other metals than titanium may be employed in this "coating" step. Calcium carbonate suspended in excess in a solution of zinc sulphate will "coat" with a mixture of basic zinc carbonate and calcium sulphate. Such a compound will find use in cheaper papers, such as news, conveying brightness and opacity provided the white water of the paper machine be re-used to such an extent as to inhibit the removal of calcium sulphate by the solvent action of said water. In all such applications the controlling factor is the use of the carbonate selected in such an amount that an unreacted nucleus be preserved. Other factors may be varied at will but, obviously, unless a "kernel" of such un-reacted material be conserved within the finished particle then the expression "extended" would become a misnomer.

Inasmuch as the basal concept disclosed herein may be so extensively modified by substitution of the base employed, by change in the acid involved, and finally, by the metal employed in the coating step, it follows that all such matters must be made the subject of future patent applications dealing specifically with the combination at issue. I have, therefore, severely limited the claims, reserving to the instant application the combination of carbonate selected from a Markush grouping of bases while the coating metal remains a form of titanium.

Having thus fully described my process, I claim:

1. The method of producing an extended pigment suited for use as a paper filler and coating ingredient which comprises; suspending a carbonate of a metal selected from the group consisting of calcium, barium, magnesium and zinc in an aqueous solution of a soluble titanium fluoride, the carbonate being present in excess of the amount required to produce complete elimination of soluble titanium from the reacting substances, thus producing upon an unaltered nucleus of the carbonate selected a superficial coating of water-insoluble titanium compounds.

2. The method of producing an extended pigment set forth in claim 1, with the added step that said pigment be separated from the aqueous medium in which it was formed and subsequently heated to a temperature maintained between 400° C. and 600° C. until optimum opacity has been obtained thereby.

3. As a composition of matter, an extended pigment composed of an unaltered nucleus of a metallic carbonate, substantially insoluble in water and white in color, superficially coated with water-insoluble titanium compounds produced when said carbonate is suspended in an aqueous solution of titanium fluorides, the metallic carbonate being present in excess of the amount required to precipitate all of the titanium in solution, said carbonate being selected from the group consisting of calcium, barium, magnesium and zinc.

References Cited in the file of this patent

UNITED STATES PATENTS

| 2,170,800 | Barton | Aug. 29, 1939 |
| 2,260,826 | Booge | Oct. 28, 1941 |

FOREIGN PATENTS

| 476,658 | Great Britain | Mar. 5, 1936 |
| 517,913 | Great Britain | Feb. 13, 1940 |

OTHER REFERENCES

Barksdale: Titanium, 1949, pages 83 and 84.